UNITED STATES PATENT OFFICE.

MAX MONHAUPT, OF ALTONA-OTTENSEN, GERMANY.

PROCESS FOR THE MANUFACTURE OF EDIBLE PRODUCTS FROM BASSIA SEEDS.

1,030,674.     Specification of Letters Patent.     Patented June 25, 1912.

No Drawing.     Application filed November 17, 1911. Serial No. 660,807.

*To all whom it may concern:*

Be it known that I, MAX MONHAUPT, a subject of the Emperor of Germany, residing at Friedensallee 65, Altona-Ottensen, in the Province of Schleswig-Holstein, Prussia, German Empire, have invented certain new and useful Improvements in Processes for the Manufacture of Edible Products from Bassia Seeds, of which the following is a specification.

This invention relates to the extraction of edible substance from Bassia seeds and particularly from the residues left after pressing these seeds.

Experiments conducted by me have proved that when the broken up Bassia seeds from which a part of the oil has been extracted by pressing, are treated with strong spirit which is highly heated, the remaining oil can be completely separated out. The strong spirit in this process acts mainly as an agent for drawing out the oil contained in the cells. On the basis of this result the same agent, spirit, can be used not only for extracting the oil, but also, in diluted condition, for removing the bitter principle from the residues. Further, it is possible, in a comparatively simple manner, to separate the bitter principle from the solution of the residue in spirit, whereby a substance rich in nourishing constituents is obtained as a by-product. In accordance therewith the following process has been devised for treating the crushed seeds from which the oil may have been extracted to a greater or lesser extent by pressing.

The crushed residues of the Bassia seeds are mixed with spirit containing 88 to 93% of alcohol by weight, in known extraction apparatus. The strength of the spirit used in the extraction depends on the amount of moisture in the seeds. The spirit, diluted corresponding to the natural moisture contents of the Bassia seeds then draws out the bitter principle and the sapotoxin. In consequence of the evaporation occurring during the extraction the spirit gradually becomes stronger, although the amount of water in the extract is partially held back by the dissolved sugars and glycosid. In some cases dephlegmators or water absorbing agents are subsequently introduced into the apparatus, to increase the proportion of alcohol in the extract and accelerate the extraction of the oil. When the extraction is finished the spirit is distilled off from the liquid and the extract placed in hot water. The oil collects on the surface and can be separated off. The aqueous solution is acidulated, preferably with sulfuric acid and heated for a considerable time, in some cases under pressure. The glycosid is thereby decomposed, the bitter principle and any sapogenin originating from possibly present sapotoxin, precipitated out as insoluble bodies and thus separated. The remaining acid, sugary liquid is neutralized by means of chalk or the like, the precipitated sulfate separated out, and the liquid concentrated. The crushed residues of the Bassia seeds in the extractor are freed by evaporation from the alcohol they still contain and are then dried after which they are quite ready for use as fodder. In this way a valuable, highly nourishing seed flour is obtained, the residue of the oil left when being pressed into cakes, and a substance rich in sugar, suitable as a food product for animals or for the manufacture of sugar colors.

In a modification of the foregoing process, the dried seed powder, from which the oil has been partly extracted, is first treated in the hot spirit containing about 95% of alcohol, and water then added until the percentage of alcohol has fallen to 85, so that the extraction of the glycosid and possibly present sapotoxin, which are with difficulty rendered soluble in strong alcohol, is accelerated. Instead of spirit methyl alcohol, or other related alcohols or mixtures of the same, can be used, also such solvents of fatty bodies, acetone for example, as have the property of mixing with water.

The process is so easily carried out, and in particular, the extraction of the oil made so easy to accomplish, that in treating Bassia seeds by the present process it is not of much moment to what extent the crushed seeds have previously been deprived by pressing of their oil; the oil obtained by the process is moreover of very good quality.

Having now described my invention what I claim as new and desire to secure by Letters Patent is:

The herein described process for the extraction of edible substances from Bassia seeds from which a portion of the oil has been extracted, which consists in treating the seeds with strong hot spirits, distilling off the spirits from the extract, immersing the extract in hot water, then acidulating with acid and heating, then neutralizing and finally concentrating the same.

In testimony whereof I affix my signature in presence of two witnesses.

MAX MONHAUPT.

Witnesses:
ERNEST H. L. MUMMENHOFF,
EDWARD HOPF.

Copies of this patent may be obtained for five cents each, by addressing the "Commissioner of Patents, Washington, D. C."